BEST AVAILABLE COPY

J. Hollen.

Knitting Machine.

BEST AVAILABLE COPY

No. 2,225. Reissued Apr. 10, 1866.

UNITED STATES PATENT OFFICE.

JOSEPH HOLLEN, OF BLAIR COUNTY, PENNSYLVANIA, ASSIGNOR, BY MESNE ASSIGNMENTS, TO JOHN NESMITH.

IMPROVEMENT IN KNITTING-MACHINES

Specification forming part of Letters Patent No. 7,509, dated July 16, 1850; extended seven years; Reissue No. 2,225, dated April 10, 1866.

*To all whom it may concern:*

Be it known that I, JOSEPH HOLLEN, formerly of White township, in the county of Cambria and State of Pennsylvania, but now residing in Blair county, State aforesaid, have invented certain new and useful Improvements in Knitting-Machines; and I do hereby declare that the following is a full, clear, and exact description of the principle or character which distinguishes it from all other things before known, and of the usual manner of making, modifying, and using the same, reference being had to the accompanying drawings, making a part of this specification, in which—

Figure 1:
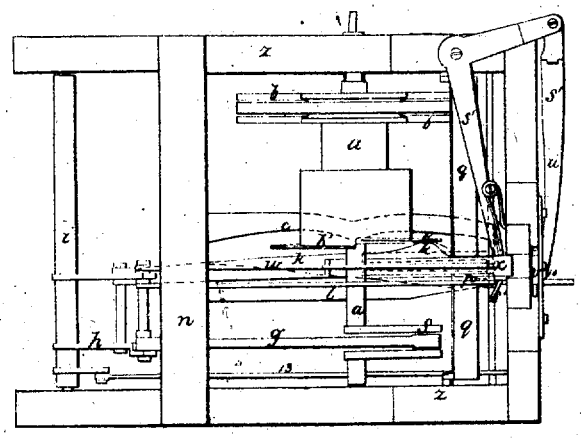
Figure 2:
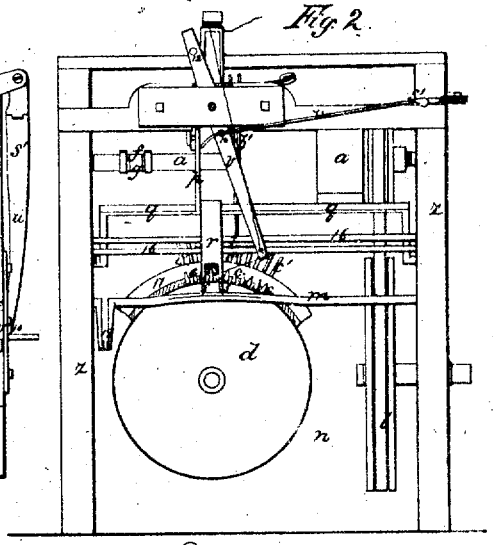
Figure 3:
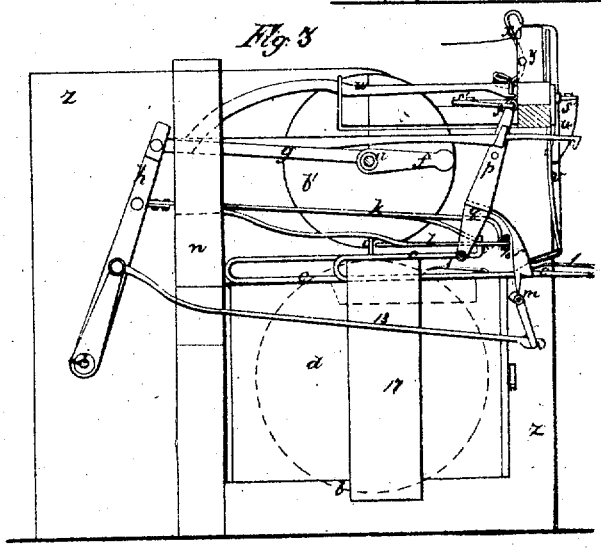
Figure 4:
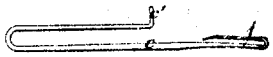
Figure 5:
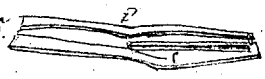

Figure 1 represents a top plan of a knitting-machine. Fig. 2 represents a front elevation thereof. Fig. 3 represents a side view with the side frame removed to better show the interior. Fig. 4 represents one of the needles detached from the machine to show its construction. Fig. 5 represents a view of the slide and bar detached from the machine.

Similar letters of reference where they occur in the several separate figures denote like parts of the machine in all the figures.

My invention consists, first, in so forming the needles as that each shall be capable of being separately projected and withdrawn in the operation of knitting by the application thereto of suitable mechanism for producing these movements.

My invention further consists in the means of projecting and withdrawing the separate needles, or the substantial equivalents, of a knitting-needle when used to perform its functions.

My invention further consists in the arrangement of the needles on a cylinder, and the means of moving the cylinder as a needle-carrier.

My invention further consists in a certain combination of jack, sinkers, and depressers, as will be explained.

My invention further consists in a thread-bearer, having an extended sidewise motion to and fro at each stitch, by which it lays the thread across the needle at each stitch and returns with it to be ready for the next stitch.

My invention further consists in a spring-vise for regulating the supply of thread to the needle, in connection with a mechanism for opening and closing said vise; and my invention finally consists in an arrangement and combination of the several parts of the machine, by which their various motions are derived from a single crank or motor.

To enable others skilled in the art to make and use my invention, I will proceed to describe the same with reference to the drawings.

A main crank-shaft, *a*, is placed across the machine, and has proper bearings in the frame thereof. Its location is above the needles, to be hereinafter described, and at right angles to them. This shaft *a* receives its motion from a driving-wheel, *b*, which is turned by any power, and communicates its motion through a band and pulley or otherwise to the shaft, through which the power is transmitted to all other parts of the machine. On the shaft *a* there is an inclined disk *b'*, formed like the single turn of a screw-thread, which serves to move the needles laterally, as will be hereinafter described.

The needles *c* are made of the same form as those used in ordinary stocking-looms; but instead of fastening their shanks to permanent bars, they are extended back for some distance and then turned over into a long loop, the extreme end *c'* of which is turned upward directly under the center of the shaft *a*. (A separate view of this needle is shown in Fig. 4.) The needles thus formed are arranged parallel with each other, either in a straight line or around a cylinder. This latter plan I have adopted in my drawings and description. The other will be perfectly obvious to any competent machinist.

The cylinder *d* for holding the needles is placed at right angles to and directly below shaft *a*, and on the surface of this cylinder the needles are arranged in a parallel row, and are properly confined, with the projection *c'* standing out radially from the cylinder directly under the shaft *a*, and forming a series of teeth into which the thread of the screw-shaped disk *b'*, above named, works to turn cylinder *d*, moving it the breadth of a needle at each revolution, which completes a single stitch.

The crank *f* on shaft *a* is connected by a pitman, *g*, to an arm, *h*, on a shaft, *i*, and to this same arm there is connected a rod that extends forward to the vertical arm *p* of a rock-shaft, *q*, by which it is connected by a long slot or notch, so as to act on the shaft during a portion of its motion, and there leave it in a state of rest, thus alternating it back and forth, and leaving it at the end of each motion, where it is held by a spring in either position. To the rock-shaft *q* a jack, *r*, is attached, which projects forward over the end of the cylinder *d*, and to this two sinkers, *s*, are permanently attached; and it will be perceived that they can be placed at any convenient distance apart, as they have only one needle to act on at a time, which is thrust forward from the line for that purpose between said sinkers while the stitch is being formed. The space between the sinkers is occupied by the presser, by which the point of the needle is brought down to pass under the stitch. The space between the sinkers admits of great latitude in the position of the needles, and avoids accidents when a needle becomes bent or does not run true. To thrust the needles forward and return them to their places I employ a forked lever, *k*, one prong of the fork of which is behind the projection *e'* on the needle and forces it forward. The other is in front, and on the return of the lever draws the needle back. This lever is moved back and forth by the lever *h*, and is guided so as to take forward the proper needle by an oblong opening in plate *l*, which is jointed to a bar, *n*, in the frame behind the shaft *a*, and is moved laterally into position by the cam *e*, so as to take up each succeeding needle as the cylinder revolves.

The cylinder and needles having a constant motion given to them by the worm-cam *e*, it is necessary for the bar *k* to move with them, and shift suddenly at the end of the stroke of one needle so as to throw forward the next. This is done by the cam *e* acting between two projections, one on the bar *k* at *k'* and the other on the bar *l'*, attached to the slide *l*, at its end. Thus the slide *l* moves with the needles until a turn of the cam is completed, and then suddenly shifts back to cause the bar *k* to take forward another needle. (See Fig. 5.)

The thread bearer *v* is a vertical arm vibrating in front of the jack, with its lower end bent inward so as to pass under the sinkers. This thread-bearer has a considerable range of action to compensate for any irregularities, and is moved by a bent lever, *s'*, connected by one arm with the arm *p* of the rock-shaft *q*, and having its other arm coupled with the bearer *v* by the connecting-rod *u*, either above or below its fulcrum, according to the direction it is desired to move the thread-bearer in. The rod *w*, (which is jointed to the lever *h*,) when projected forward, strikes the tail of a small spring-vise, *x*, through which the thread is passed and releases the thread, allowing a sufficient quantity to pass for each stitch, and, by closing when the rod *w* is withdrawn, prevents more thread from passing.

*y* is the center in which the jaw of the vise *x* works.

*z* is the frame of the machine.

*m* is a bent bar, which is worked by the rod 13, which is jointed to the lever *h*, and serves to hold the stocking to the cylinder while the needle is thrown forward and draw the cloth down at the proper time to pull the loop off the end of the needle.

The wires 16 form a guide for the ends of the pieces *l* to rest on. There is a depression in the cylinder *d* under the piece of leather 17 that holds the needles in place, and which allows of the needles being taken out for cleansing, repairing, &c.

The operation is as follows: Supposing a part of the stocking completed and the last stitches remaining on the needles, and the thread leading from the bobbin through the vice *x*, down the thread-bearer *v*, and through the holes in its lower end to the stitch last formed, as shown by a red line in Fig. 2. Upon giving motion to the machine, one of the needles is projected forward, leaving its last stitch on the shank beyond the point of the needle, at the same time the thread is laid across it by the thread-bearer *v*. The jack *r* then moves downward and presses or sinks the thread down on the needle, and the needle being then withdrawn, the thread passes into the loop 1 of the needle, and after this the point comes in contact with the presser between the sinkers, and is bent downward till it enters the groove, and then passes through the stitch previously formed, carrying the thread with it. As the thread is laid over the needle, the vise opens and lets pass a sufficient quantity to make the stitch. The succeeding revolution causes the next needle to be presented, and the stitches are then formed in succession.

To knit back in the opposite direction, the motion of the machine is reversed, and the pin 10 in the connecting-rod *u* is changed to the hole 12 of the thread-bearer *v*, which reverses the motion of the thread-bearer, the two holes being on opposite sides of the center of motion or pivot of said bearer.

This form of knitting-machine can be adapted to any variety of plain knitting work, and by continuing the needles entirely around the cylinder a piece of work may be made without a seam. By the projection of the needles one at a time, and dispensing with the sinkers used in other machines, closer knitting can be done with an equal-sized thread, and the extreme nicety in the fitting of the several parts required for fine work in other machines is not required in this, and the working parts can therefore be made stouter and more durable, and consequently are less liable to get out of repair.

Having thus fully described my invention, what I claim therein as new, and desire to secure by Letters Patent, is—

1. Forming the needle in the manner substantially as described, so that each needle shall be capable of being separately projected and withdrawn in the operation of knitting by the application thereto of mechanism, substantially such as described, for producing these movements.

2. The above-described means of projecting and withdrawing the separate needles, or any other substantial equivalent of a knitting-needle, when used to perform its functions.

3. The arrangement of the needles on a cylinder, in the manner described, in connection with the described means of moving or revolving the cylinder as a needle-carrier.

4. The combination of the jack, the sinkers, and depressors, substantially as described.

5. The thread-bearer *v*, having an extended sidewise motion to and fro at each stitch, by which it lays the thread across the needle at each stitch and returns with it to be ready for the next stitch.

6. The spring-vise for regulating the supply of thread to the needle opened by the rod *w*, substantially as described.

7. The particular arrangement and combination of the several parts of the machine, by which their various motions are derived from a single crank and screw-thread, substantially as described.

JOSEPH HOLLEN.

Witnesses:
HUGH MULHALEN,
JOHN CAMPBELL.